United States Patent [19]

Wang et al.

[11] Patent Number: 5,060,914
[45] Date of Patent: Oct. 29, 1991

[54] METHOD FOR CONTROL OF PROCESS CONDITIONS IN A CONTINUOUS ALLOY PRODUCTION PROCESS

[75] Inventors: Hsin-Pang Wang, Rexford, N.Y.; Yuan Pang, North Reading, Mass.

[73] Assignee: General Electric Company, Schenectady, N.Y.

[21] Appl. No.: 552,980

[22] Filed: Jul. 16, 1990

[51] Int. Cl.$^5$ ............................................. H05B 7/20
[52] U.S. Cl. ...................................... 266/236; 266/239
[58] Field of Search ............................... 266/236, 239

[56] References Cited

U.S. PATENT DOCUMENTS

| | | | |
|---|---|---|---|
| 4,345,467 | 8/1982 | Carlson | 73/309 |
| 4,654,858 | 3/1987 | Rowe | 373/72 |
| 4,793,596 | 12/1988 | Kutota | 266/239 |

OTHER PUBLICATIONS

Wang, H. P. and Perry, E. M.; "Criteria for Achieving a Stable Solidified Layer Inside a Nozzle Using Integral Solutions"; General Electric Corporate Researach and Development Report No. 88CRD288; Oct. 1988.

Wang, H. P. and Perry, E. M.; "Formation and Growth of the Sodified Layer During Filling in the Investment Casting Process with an Application for Titanium Casting"; General Electric Corporate Research & Development Report No. 88CRD023; Jun. 1988.

Primary Examiner—Peter D. Rosenberg
Attorney, Agent, or Firm—James R. McDaniel; James C. Davis, Jr.; Paul R. Webb, II

[57] ABSTRACT

A method for controlling process conditions in a continuous skull nozzle process is provided wherein one or more process parameters are controlled to maintain the operation of the process within a process window derived using integral solutions and expressed in terms of dimensionless parameters. The process window defines a range of values for the controllable process parameters within which a steady state solidified skull will be maintained and outside of which a steady state solidified skull will not be maintained. A pressure differential between the inside of a crucible holding the melt and outside of the crucible is one process parameter which is controlled to adjust the melt discharge flow rate to maintain operation within the process window.

20 Claims, 7 Drawing Sheets

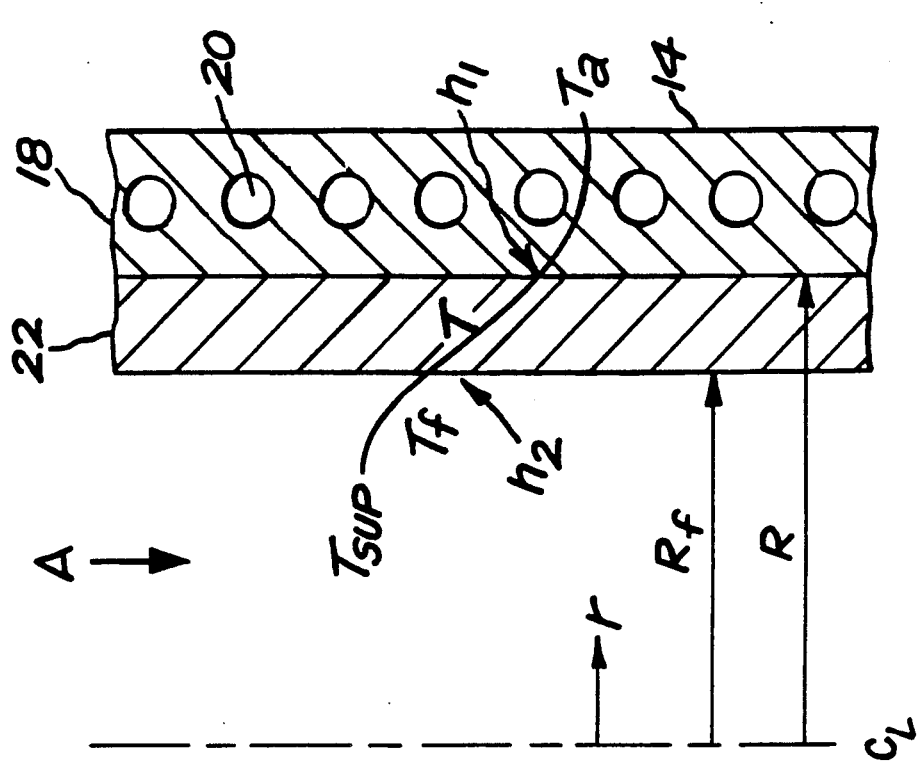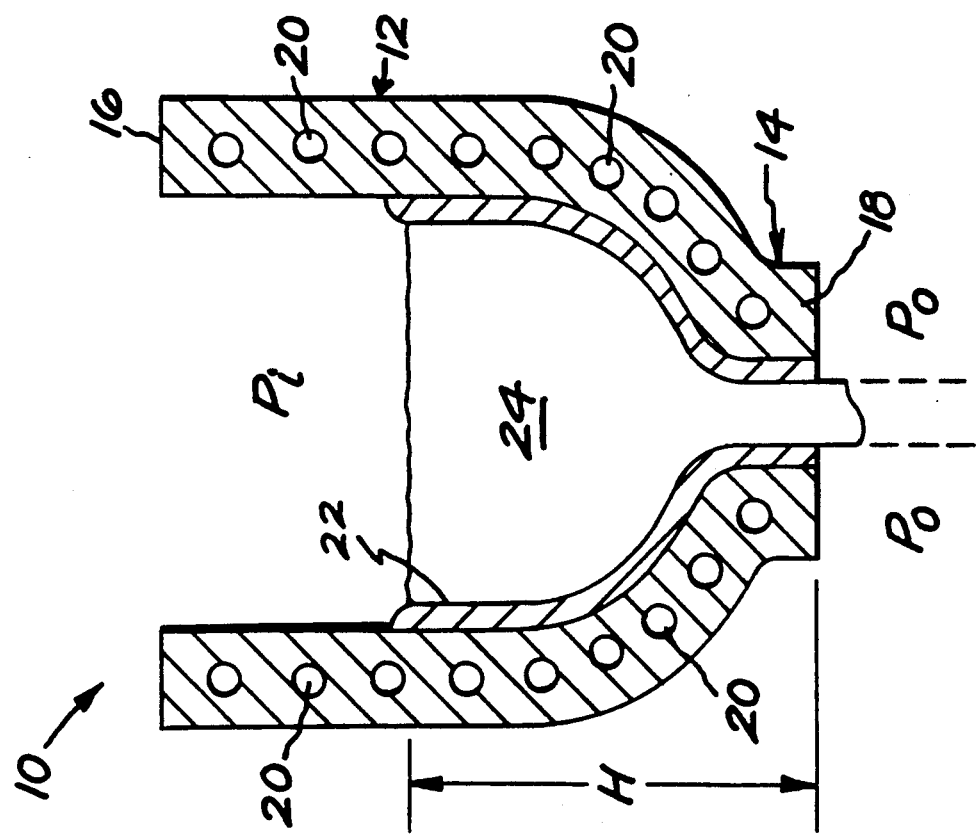

METHOD FOR CONTROL OF PROCESS CONDITIONS IN A CONTINUOUS ALLOY PRODUCTION PROCESS

BACKGROUND OF THE INVENTION

1. Field of the Invention

The present invention relates to a method for controlling process conditions in an alloy production process, and particularly relates to a method in which a generic process window is defined and a control strategy is implemented based on the defined process window to achieve the desired process conditions.

2. Description of Related Art

It is widely recognized that one of the most important and urgent areas of materials research in the coming decade is the advancement of materials processing technology for a new generation of materials including metals and metal alloys. As an example, eliminating or substantially reducing the material impurities and eliminating or substantially reducing the presence of defects in fabricated parts or components are considered the major bottlenecks in improving the quality of the high performance aircraft engines to be built in this decade and beyond.

Efforts have heretofore concentrated on producing high quality metal powders to be employed in the fabrication of components, and the concentration on production of high quality powders from which components may be made is regarded as a major step in making "clean" materials for parts or components. The production of titanium and/or titanium alloys in powder or ingot form is of special significance in the aircraft engine field, due to the importance of the titanium and its alloys in designing and producing improved engine components. Notwithstanding the effort expended in developing processes or methods to produce high quality metal powders, a serious problem persists with respect to the production of high quality titanium and titanium alloys in that the high level of chemical reactivity of liquid titanium yields or tends to yield unacceptable levels of impurities in the intermediate forms, such as powders, or in the end product.

Because of the high reactivity of liquid titanium, the melting of the titanium or Ti alloy and discharging of the liquid titanium or Ti alloy are generally done in a technique known in the art as cold hearth or skull melting. An example of this technique is described in U.S. Pat. No. 4,654,858, issued to Rowe, and assigned to the assignee of the present application. Other skull melting configurations have also been disclosed in the art, and all of these may be characterized as having a crucible which retains the molten titanium, the crucible being made of a material other than titanium, and, in the "bottom pouring" embodiments, a discharge nozzle, also likely to be made of a material other than titanium. The skull melting technique attempts to avoid the problem of a reaction occurring between the liquid titanium and the crucible and nozzle materials by developing a skull of solid titanium covering the internal surfaces of the crucible and nozzle. The term "continuous skull nozzle process" will be used herein to refer to processes of this type in general.

While continuous skull nozzle processes have been in use in the art for a number of years, problems remain in such processes, particularly those in which an elongated discharge nozzle is employed (as compared with an orifice as depicted in the above-identified '858 patent), in that the formation and control of a stable skull inside the nozzle has proven to be a major hurdle in the development of consistent, dependable processes for melting and discharging the liquid alloy from the crucible. The two principal problems experienced with skull formation in the nozzle are skull "freeze-off" and skull "melt-away". Freeze-off of the skull prevents the continued flow of the liquid alloy out of the crucible to a further apparatus, such as a melt spinning device or continuous ingot casting device. Melt-away of the skull leaves the nozzle material exposed to react with the liquid titanium or alloy, which is likely to cause rapid deterioration of the nozzle by way of either chemical reaction or physical erosion.

Prior attempts to control skull freeze-off or otherwise stabilize the skull geometry in the nozzle have all suffered from disadvantages which have ultimately rendered the proposed solutions ineffective, impractical, and in some instances, undesirable. In one such proposed solution, local induction heating applied to the skull at the nozzle was attempted as a means for preventing nozzle freeze-off from occurring. This approach proved to be ineffective at providing the necessary heat penetration required for maintaining a molten stream at the center of the nozzle, due to the skin effect which concentrates the heat generated at the outer portions of the nozzle and skull. The skin effect of the induction heating actually has a counterproductive effect in that most of the heat generation is concentrated at the outer skin, where a layer of solidified skull is required to be maintained.

The concept of a magnetic levitation nozzle has been propounded as an alternative approach to providing a physical crucible and nozzle structure, thereby eliminating contact between the containment or confinement means and the liquid titanium or alloy thereby preventing any chemical reaction from taking place. Because of the limited strength of the magnetic force, the potential for replacing the skull crucible and nozzle with a levitation nozzle, in view of the current level of technology, shows almost no promise.

The levitation nozzle approach has been proposed for use on a more limited basis to confine the melt stream only. In this approach, an induction coil would be used to confine the melt stream by generating a magnetic field to induce a thin layer of "body force" on the surface of the melt stream, the force having substantially the same effect as creating a positive hydrostatic pressure at the melt stream. The purpose of this type of levitation confinement is to control the flow rate and diameter of the liquid metal melt stream, without specifically dealing with the problem of maintaining a stable skull geometry in the nozzle.

Even in this more limited approach the levitation nozzle is unattractive due to problems intrinsic to the design of the induction coil, and due to problems in the application of this technology to confining the melt stream, such as the alignment of the coil, the stability of the induced current, the electromagnetic field interference and coupling, the complicated coil design, and problems with melt stability, asymmetry and splash. Further, since a crucible and nozzle would still be fundamental components in a system employing levitation to control the diameter of the melt stream, the complicated coupling and interaction between the levitation nozzle and the overall system would require tremendous experimental effort to validate the concept. Simplified experiments are not likely to adequately address the interactions among the levitation force, the nozzle size, and the formation, growth and control of the skull.

Heretofore lacking in prior efforts directed to continuous skull nozzle processes has been systematic investigation of the skull freeze-off and melt-away, which are the serious processing problems in this field. It has further not previously been recognized that a process window for the process of melting and discharging of liquid titanium or other metal or alloy may be developed or defined and used to implement a control strategy in controlling process parameters to produce and maintain a stable skull configuration in the crucible and nozzle.

It is therefore a principal object of the present invention to provide a method for defining a process window for a continuous skull nozzle process which identifies the appropriate conditions for achieving a steady-state solidified layer or skull in a continuous skull nozzle process, and controlling one or more process parameters such that the process operates within the defined process window.

It is another important object of the present invention to provide a method for controlling a continuous skull nozzle process which entails defining a process window for achieving a steady-state solidified layer or skull and using the process window to establish a control strategy whereby the continuous skull nozzle process will be carried out under conditions in which a stable skull configuration exists in the crucible and especially in the nozzle.

It is another important object of the present invention to provide a method for controlling a molten metal flow rate, which subsequently affects a heat transfer rate, the skull thickness, and the melt stream diameter, by use of a pressure differential control.

It is another important object of the present invention to provide a method for controlling a continuous skull nozzle process including the use of a pressure differential control of the molten metal flow rate in combination with other process controls such as control of the superheat temperature in the melt and of the cooling rate in the crucible and nozzle.

SUMMARY OF THE INVENTION

The above and other objects of the present invention are accomplished by providing a method for defining a process window for a continuous skull nozzle process which identifies a range of processing conditions under which a stable skull configuration will be maintained. Establishing or defining this process window involves the consideration of many parameters including the material properties of the metal or alloy being melted and discharged, the geometry of the discharge nozzle and certain process variables. The material properties of interest in the continuous skull nozzle process are thermal conductivity, density, specific heat, viscosity, phase change temperature, and latent heat. The process variables or conditions of interest are the inner and outer heat transfer coefficients, the melt superheat, and a cooling water temperature for cooling the crucible and nozzle.

The method for defining a generic process window in the present invention involves grouping the dependent and independent variables into dimensionless parameters, and using an integral approach to derive a solution representing the range of conditions in which a stable skull will be achieved and maintained inside the nozzle in terms of a dimensionless nozzle size and a dimensionless process condition consisting of a heat transfer ratio and a superheat temperature parameter. The method for controlling the continuous skull nozzle process in order to produce and maintain a stable skull configuration according to the present invention involves controlling the process parameters as appropriate in order to attain the necessary process conditions for a particular metal or alloy being processed such that the process conditions fall within the process window defined for obtaining a steady-state solidified layer in the nozzle.

The present invention also includes a method for controlling the molten metal flow rate through the nozzle by controlling a pressure differential between the inside of the crucible and the outside of the crucible. Control of the molten metal flow rate will affect the heat transfer rate, skull thickness, and melt stream diameter. The control of the pressure differential between the inside of the crucible and the outside of the crucible, which will generally entail using a gas pressure inside the crucible which is lower than a gas pressure outside the crucible, thus works to control flow and heat transfer characteristics to obtain the designated process conditions.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the invention, taken in conjunction with the accompanying drawings wherein like reference characters represent like parts through the several views.

FIG. 1 is a substantially schematic cross-sectional view of a cold hearth crucible and nozzle configuration suitable for use in a continuous skull nozzle process.

FIG. 2 is a schematic representation of the formation of a solidified layer which serves as a model for a nozzle configuration.

DETAILED DESCRIPTION OF THE INVENTION

Figure 3:
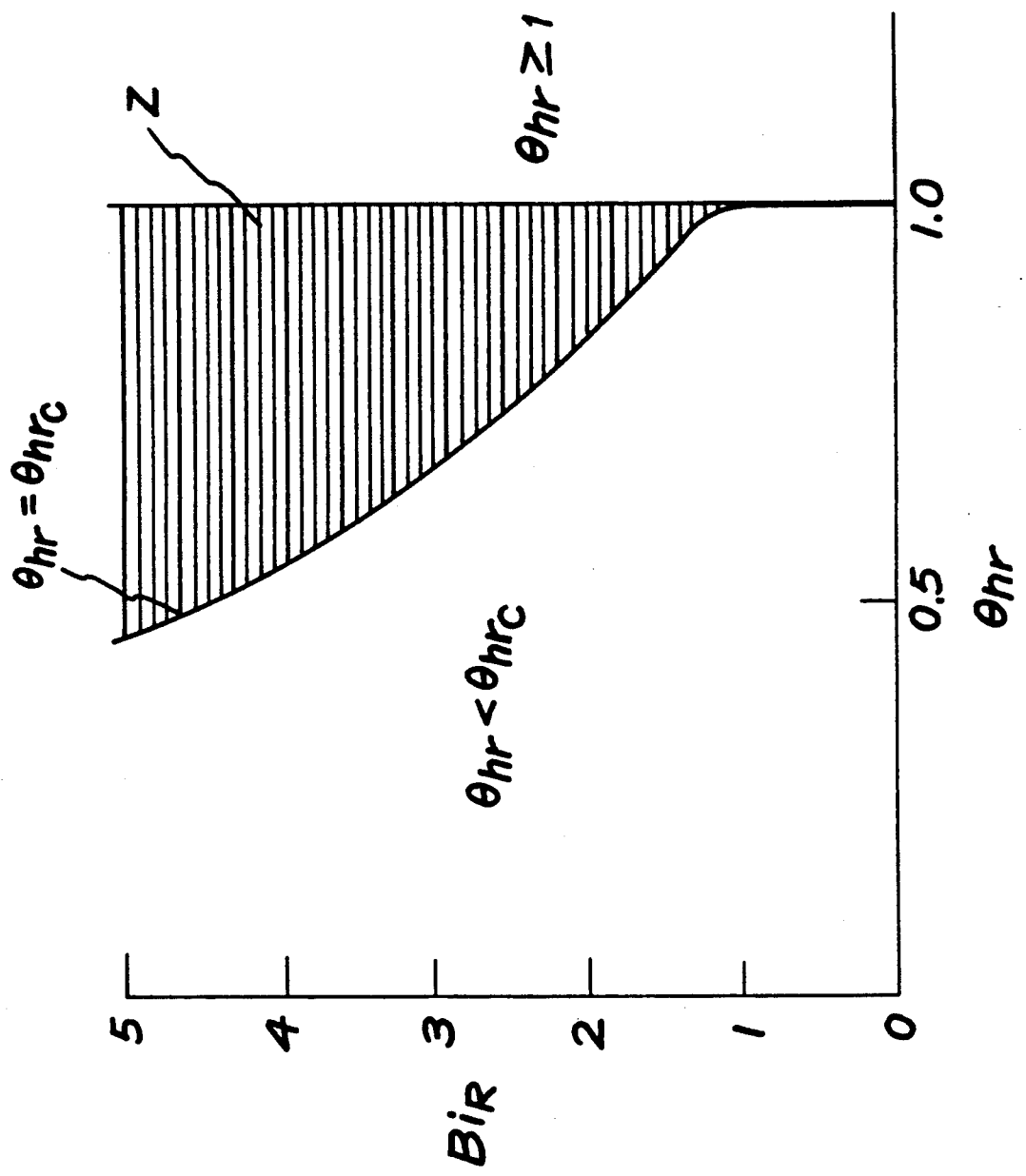
FIG. 3 is a graphical representation of a generic process window for achieving a steady-state solidified layer defined in accordance with the method of the present invention.

Referring initially to FIG. 1, an apparatus 10 is depicted in substantially schematic form which comprises a crucible 12 and bottom nozzle 14, the apparatus being employed as a receptacle for use in a continuous skull nozzle process for melting and discharging liquid titanium, a liquid titanium alloy, or another metal or metal alloy. The crucible wall 16 and nozzle wall 18 are provided with channels 20 through which a coolant is passed in order to retain the walls of the crucible and nozzle at a desired temperature.

Particularly in the case of titanium or titanium alloy processing, the process referred to herein as a continuous skull nozzle process relies on the presence of a skull or layer 22 of solidified titanium or alloy to isolate the crucible and nozzle walls 16, 18 from the molten titanium/titanium alloy 24 which is to be discharged through the bottom nozzle 14 for further processing. As indicated previously, the titanium/titanium alloy in liquid form has such a high chemical reactivity that the titanium/titanium alloy is almost certain to pick up impurities in the form of dissolved crucible wall material in the absence of this skull 22. Prior processes having employed such a skull, however, have not been capable of consistently forming and controlling a stable skull inside the nozzle, resulting in either the freeze-off or melt-away situations as described previously.

The present invention recognizes that the growth or decay of the solidified skull inside the nozzle is a very complex function involving many parameters, including the properties of the material being processed, the geometry and the process conditions. Because the maintenance of a stable solidified skull involves control of a phase change interface, there are complex interactions among many parameters, and attempting to attach a particular significance to the influence of one or more individual parameters on the process and skull formation can be confusing and misleading. The present invention therefore employs a systematic scheme of analysis to evaluate the parametric relations among the several parameters to define a process window inside of which the continuous skull nozzle process may be carried out wherein a stable skull geometry which will not be susceptible to the problems of freeze-off or melt-away is maintained. The present invention further provides a novel control strategy based on the control of a pressure differential between the inside of the crucible 12 and the outside of the crucible in maintaining the stable skull geometry.

The method of defining a process window according to the preferred embodiment of the present invention takes into account various material properties, namely, the thermal conductivity of the material, density, specific heat, viscosity, phase change temperature, and latent heat. The method also takes into account process conditions, namely, an inner and outer heat transfer coefficient, the melt superheat, and the cooling water temperature, the inner and outer heat transfer coefficients are functions of the Reynolds numbers and Prandtl numbers of the melt and coolant flows, and the heat transfer coefficients may be determined accordingly in each specific process.

FIG. 2 is a schematic representation for modeling the formation of a solidified layer or skull in a nozzle having a cylindrical inner surface of radius R as measured from the center line. Shown in this figure, in addition to nozzle wall 18 and skull 22, are diagrammatic representations of the heat transfer taking place between the molten liquid metal flowing through the nozzle in the direction of arrow A and the ambient or cooled wall 18 of nozzle 14.

An inner heat transfer coefficient $h_2$ is indicated at the boundary between the liquid phase metal and the solid phase metal, and an outer heat transfer coefficient $h_1$ is shown at the boundary between the solidified layer or skull 22 and the inner surface of nozzle wall 18. The variables $T_{sup}$ and $T_a$, the superheat temperature in the liquid metal and the ambient temperature, respectively, are also diagrammatically represented in the figure. The sloping line labeled T is representative of the temperature profile across the solidified layer or skull 22. Also identified in FIG. 2 are the liquid-solid phase change temperature for the titanium/titanium alloy, $T_f$, and the radius of the solid/liquid phase line, $R_f$. It can be seen from this model that the skull thickness is represented by $(R-R_f)$.

In order to develop and define a process window for general use in establishing and maintaining stable skull configurations for different materials and process conditions, the dependent and independent variables are grouped into seven dimensionless parameters, namely, a Biot number of the solid/liquid phase line radius ($Bi_f$), a Biot number of nozzle radius ($Bi_R$), a dimensionless temperature ($\Theta$), superheat temperature parameter ($\Theta_{sup}$), dimensionless time ($\eta$), heat transfer coefficient ratio ($h_2/h_1$), and phase change number ($P_h$).

Several of these dimensionless parameter will be defined at appropriate points later in the specification. Those which are not later defined, are defined as follows:

$$\Theta_{sup} = \frac{T_{sup} - T_a}{T_f - T_a},$$

$$\eta = \frac{h_1^2 \cdot t \cdot \alpha}{k^2 P_h}, \text{ and}$$

$$P_h = \frac{\alpha \rho l}{k(T_f - T_a)} \left( = \frac{1}{S_T} \right)$$

where k and $\rho$ are, respectively, the thermal conductivity and the density of the solid phase of the material being processed, $\alpha$ is the thermal diffusivity of the solid phase, l is the latent heat of the material, and $S_T$ is the Stefan number of the material, all of which are known or can be determined for the particular material being processed.

An energy balance integral approach, namely the momentum integral method, is used to derive a non-linear differential equation from which the process window for obtaining a steady-state solidified layer or stable skull inside the nozzle may be determined. FIG. 3 shows an example of such a process window Z wherein the shaded or hatched area represents the range for the nozzle sizes in terms of the dimensionless nozzle size $Bi_R$, and the range for the processing conditions, represented by $\Theta_{hr}$, consisting of the heat transfer coefficient ratio and the superheat temperature parameter, in which a stable skull will be maintained in the process. The importance of the various legends in FIG. 3 will be discussed in detail later in the specification.

The integral approach employed in the present invention will be briefly described by referring back to FIG. 2, which schematically illustrates the formation of a solidified layer for a nozzle or other internal cylindrical surface, generally referred to as an axisymmetric case.

The integrated conduction equation for this layer is $$\int_{R_f}^{R} \alpha \frac{\partial}{\partial r}\left(r \frac{\partial T}{\partial r}\right) dr = \int_{R_f}^{R} r \frac{\partial T}{\partial t} dr \qquad (1)$$

Using Leibnitz's rule for the transient term on the right-hand side results in $$\frac{d}{dt} \int_{R_f}^{R} rT(r,t)dr + R_f T_f \frac{dR_f}{dt} - \qquad (2)$$

$$\alpha \left[ R \frac{\partial T(R,t)}{\partial r} - R_f \frac{\partial T(R_f,t)}{\partial r} \right] = 0$$

The details of this integration can be found in Lunardini, V.J., I Heat Transfer in Cold Climates, VanNostrand Reinhold Company, NY, 1981.

The dimensionless temperature and its integral form is defined as $$\Theta = \frac{T - T_a}{T_f - T_a} \, ; \, \bar{\Theta} = \int_{R_f}^{R} r\Theta dr \qquad (3)$$

Equation (2) then becomes $$\frac{d\bar{\Theta}}{dt} + R_f \frac{dR_f}{dt} - \alpha \left[ R \frac{\partial \Theta(R,t)}{\partial r} - R_f \frac{\partial \Theta(R_f,t)}{\partial r} \right] = 0 \qquad (4)$$

For the axisymmetric case, the temperature field can be approximated (first-order approximation) by a logarithmic function of the radial coordinate r of the cylindrical coordinate system, as follows:

$$\Theta = a_1 + b_1 \frac{\ln(r/R_f)}{\ln(R/R_f)} \qquad (5)$$

Three boundary conditions exist for this problem, as follows:

$$\Theta(R_f,t) = 1 \qquad (6)$$

$$-k \frac{\partial \Theta(R,t)}{\partial r} = h_1 \Theta(R,t) \qquad (7)$$

$$k \frac{\partial \Theta(R_f,t)}{\partial r} + h_2 (\Theta_{sup} - \Theta(R_f,t)) = \frac{\rho l}{T_f - T_a} \frac{dR_f}{dt} \qquad (8)$$

The first boundary condition (Equation 6) can be easily solved to obtain $a_1 = 1$.

Two dimensionless parameters, a Biot number which defines the dimensionless solid/liquid phase line, and a second Biot number which his a constant defining the outer radius of the skull are defined as below:

$$Bi_f = \frac{h_1 R_f}{k} \qquad (9)$$

$$Bi_R = \frac{h_1 R}{k} \qquad (10)$$

These parameters contain the combined effect of external cooling, radius, and internal conduction. Using these parameters, one can solve Equation (7) for the remaining coefficient, and obtain the following value:

$$b_1 = \frac{-Bi_R}{Bi_R + \frac{1}{\ln(Bi_R/Bi_f)}} \qquad (11)$$

Using Equations 5, 8, and 11, the integral equation for the solid layer (Equation 4) becomes a nonlinear ordinary differential equation in dimensionless form, representing the solid/liquid phase line:

$$\left\{ \frac{\frac{Bi_R^2}{2}\left[\frac{1}{Bi_R} + \frac{1}{2}\right] - \frac{Bi_f^2}{4}}{\left[\ln\left(\frac{Bi_R}{Bi_f}\right) + \frac{1}{Bi_R}\right]^2} + \right. \qquad (12)$$

$$Bi_f^2 \left[ P_h - \frac{\frac{1}{2}}{\ln\left(\frac{Bi_R}{Bi_f}\right) + \frac{1}{Bi_R}} \right] \right\} \frac{dBi_f}{d\eta} -$$

$$Bi_f P_h \left\{ Bi_f \Theta_{hr} - \frac{1}{\ln\left(\frac{Bi_R}{Bi_f}\right) + \frac{1}{Bi_R}} \right\} = 0$$

This equation represents the moving solid/liquid phase line or solidification layer within a cylinder (nozzle) using a logarithmic approximation for the temperature field. It was formed in terms of five dimensionless parameters: two Biot numbers, one for the location of the solid/liquid phase line and another for the size of the cylinder, a phase change number, a superheat and heat transfer ratio parameter, and time. The nonlinear equation given by Equation 12 was solved using the Runge-Kutta integration scheme.

Sensitivity studies have been conducted on three of the five dimensionless parameters: $P_h$ (a material parameter), $\Theta_{hr}$, and $Bi_R$ (both of which are process design parameters). Examination of Equation (12) reveals that the steady-state solution is independent of the phase change number $P_h$. This is in agreement with the underlying process physics, since the phase line is not moving in the steady-state condition, the influence of the latent heat "1" does not exist. The effect of the other two dimensionless parameters, $\Theta_{hr}$ and $Bi_R$, will be discussed in further detail.

The dimensionless parameter $\Theta_{hr}$ is a parameter involving a combined superheat $\Theta_{sup}$ and heat transfer ratio ($h_2/h_1$), and is defined by the following relationship:

$$\Theta_{hr} = \frac{h_2}{h_1}(\Theta_{sup} - 1) \qquad (13)$$

Figure 4A:
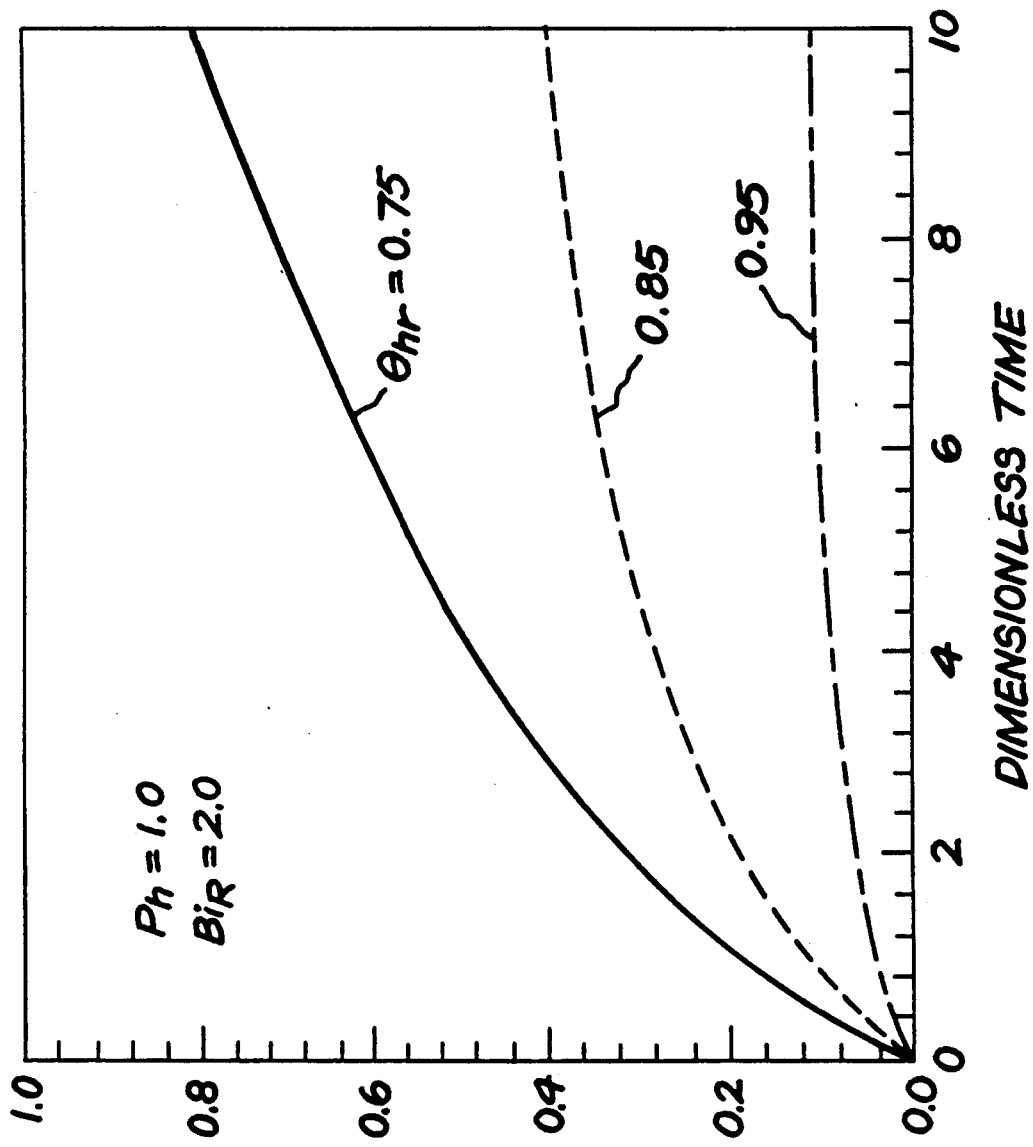
FIGS. 4A and 4B are graphs displaying the sensitivity of the combined heat transfer ratio and superheat parameter, while keeping other process parameters constant, over shorter and longer dimensionless times, respectively.

FIG. 4A shows the sensitivity of the combined superheat and heat transfer ratio parameter, defined in Equation (13), on the build-up of a solidified layer on the inside wall of a nozzle. As the dimensionless parameter $\Theta_{hr}$ increases from 0.75 to 0.95, while the other parameters are fixed at $P_h = 1.0$ and $Bi_R = 2.0$, the thickness of the solid layer formed decreases. Increasing this parameter can be done in either of two ways, namely, by increasing the superheat temperature or by increasing the heat transfer ratio. One of the driving forces for the formation of the solid layer is the temperature difference between the flowing fluid and the phase transition temperature. As the superheat temperature increases, this temperature difference increases, and there is a larger heat flux into the solidified layer. As the heat flux into this layer becomes larger, the thickness of the layer formed becomes smaller. Alternatively, the heat transfer ratio can be increased by increasing the inner heat transfer coefficient $h_2$ or by decreasing the outer coefficient $h_1$. If the inner heat transfer coefficient is increased, then the fluid can carry heat into the layer more effectively, and a thinner solidified layer is formed. If the outer heat transfer coefficient is reduced, then less cooling can be achieved at the interface, also resulting in a thinner solidified layer build-up.

Figure 4B:
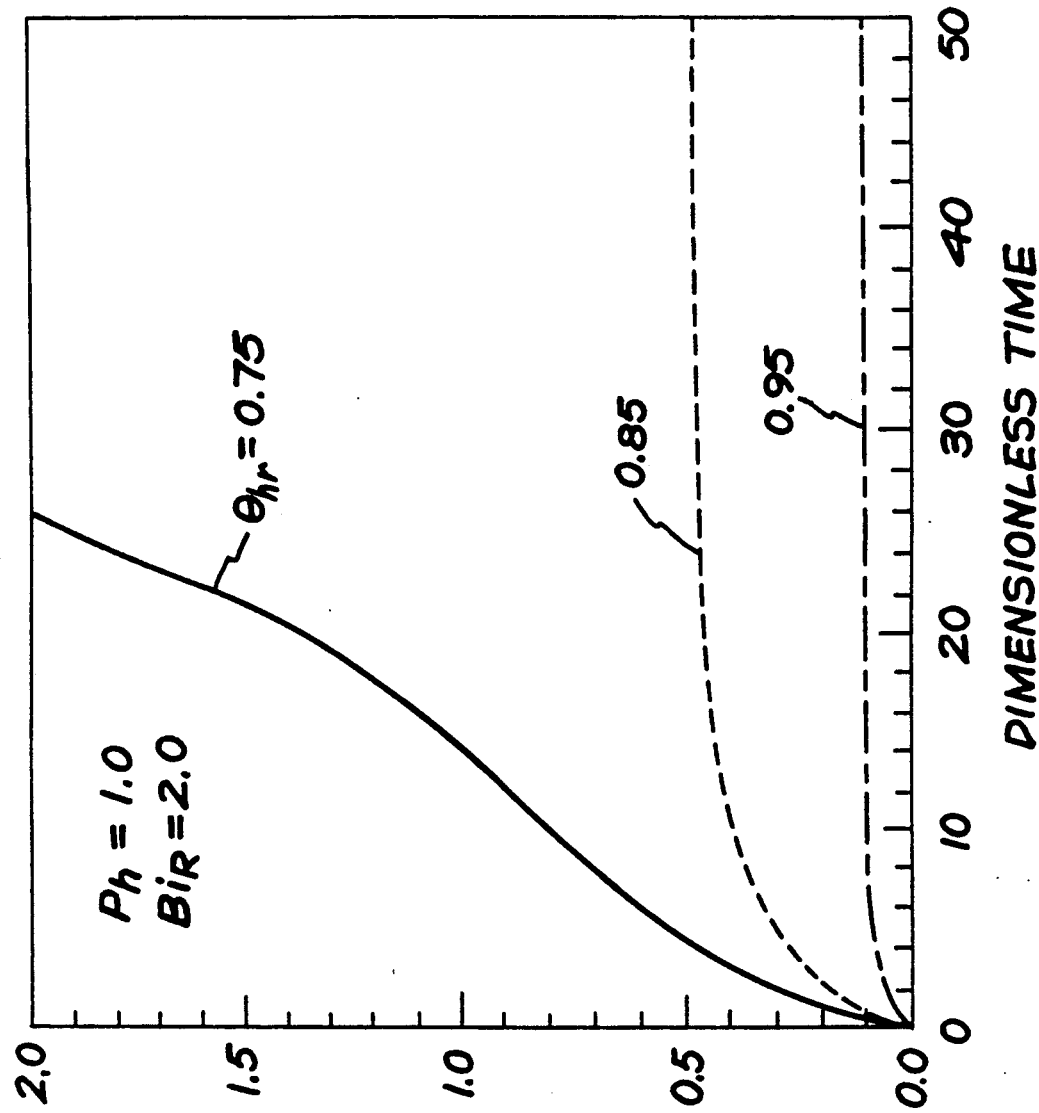

FIG. 4B shows the effect of this combined parameter on the solidified layer thickness at longer dimensionless times. It can be observed that a steady-state solidified layer cannot be formed at the lowest value for $\Theta_{hr}$ displayed in the graph. Below a certain value for this parameter, the nozzle will freeze off in time, rather than forming a stable layer of skull. Further, above a certain value for $\Theta_{hr}$, no solidified layer is formed.

In order to achieve a stable solidified layer inside the nozzle, the parametric relationships must be further examined. FIG. 4B is only used to illustrate the potential freeze-off problem, and the real solution for the formation of a solidified layer will deviate somewhat from this solution. As the layer thickness increases and becomes significant relative to the nozzle diameter, the flow area will be reduced, and the inner heat transfer coefficient $h_2$ will become a variable, previously assumed to be constant, whose value depends on whether the flow conditions are for constant gravity head or constant flow rate. Under a constant gravity head condition, such as the case of a typical sink-like tundish, $h_2$ will decrease as the solidified layer thickness increases.

The criteria for achieving a steady-state solution to Equation (12) can be derived by considering the two parts of the equation. The transient portion of the equation can be re-written as follows, to break it up into terms which can be individually considered:

$$\frac{1}{\left[\ln\left(\frac{Bi_R}{Bi_f}\right)+\frac{1}{Bi_R}\right]^2}\left\{P_h Bi_f^2\left[\ln\left(\frac{Bi_R}{Bi_f}\right)+\frac{1}{Bi_R}\right]^2 + \right. \tag{14}$$

$$\left. \frac{1}{4}\left[Bi_R(Bi_R+2) - 2Bi_f^2\left\{\frac{1}{2} + \ln\left(\frac{Bi_R}{Bi_f}\right)+\frac{1}{Bi_R}\right\}\right]\right\}\frac{dBi_f}{d\eta}$$

Figure 5:
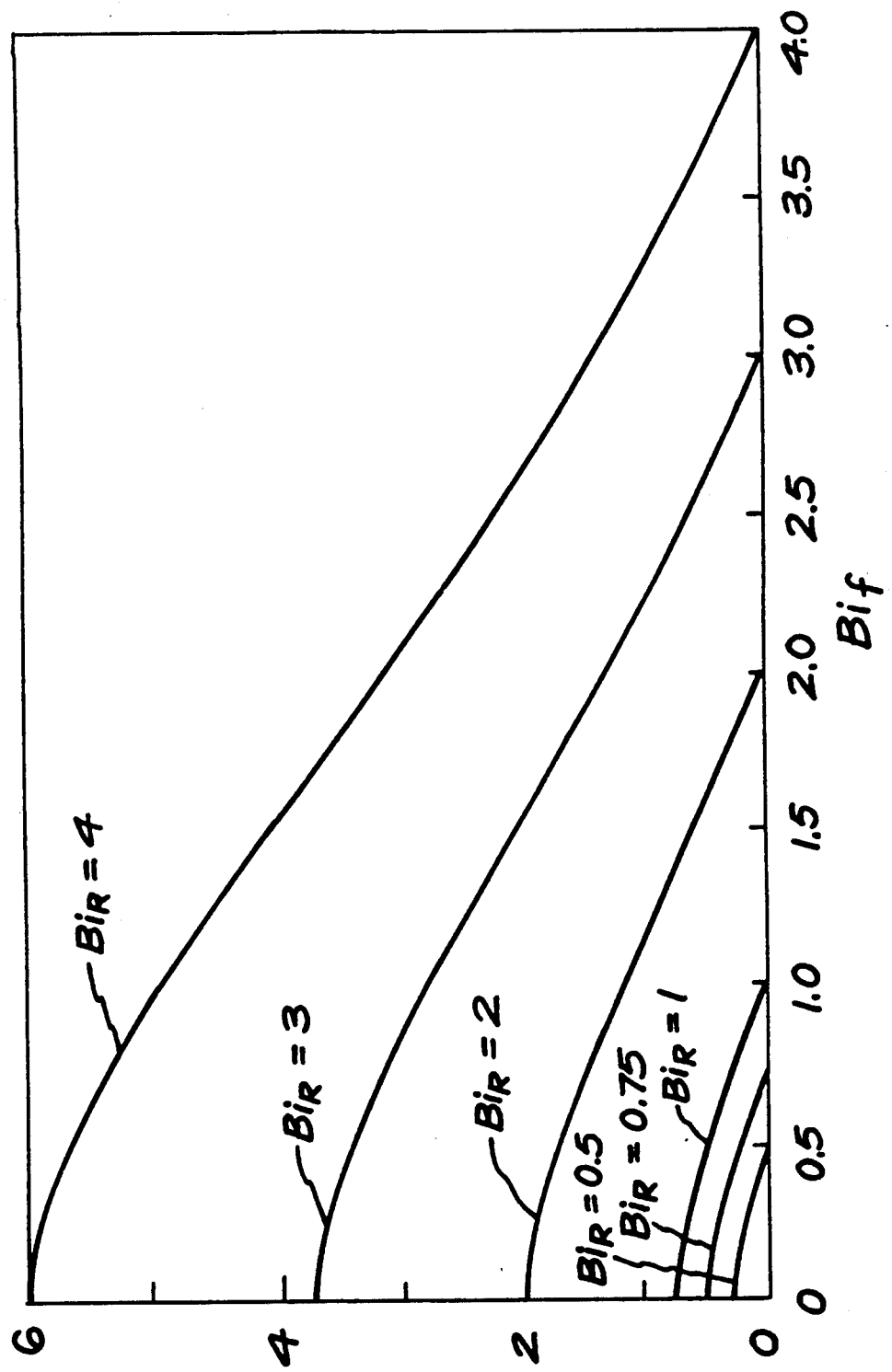
FIG. 5 is a graphical representation of the second term in Equation 14 in the specification plotted against a term $Bi_f$ for different values of a parameter $Bi_R$.

The coefficient of the entire equation fragment is always positive, due to the squaring of the denominator. The first term inside the braces is always positive, also due to squaring and the fact that $P_h$ is greater than zero. The second term inside the braces cannot be evaluated as simply, however, a graphical evaluation of this term in FIG. 5 indicates that the term is always positive. Therefore, since the entire transient portion of Equation (12) is positive, the re-melting or solidifying of the layer formed will completely depend on the sign of the steady-state term. If the steady state term is positive, then the radius of the flow region $Bi_f$ is increasing, and the solidified layer or skull would be melting or re-melting. If the term is negative, then the radius is decreasing, and the skull layer would be solidifying.

Based on this observation, the steady-state portion of Equation (12) can be considered as follows:

$$\Theta_{hr} - \frac{1}{Bi_f\left[\ln\left(\frac{Bi_R}{Bi_f}\right)+\frac{1}{Bi_R}\right]} = 0 \to \text{steady-state} \tag{15}$$

$$> 0 \to \text{re-melting}$$
$$< 0 \to \text{solidifying}$$

Further, when this term is greater than zero, the skull layer is melting or remelting toward the skull "melt-away" condition previously described, and when the term is less than zero, the skull layer is solidifying toward the skull "freeze-off" condition, also previously described. The steady-state criteria of Equation (15) can be rearranged to the following form:

$$\Theta_{hr} = \frac{1}{Bi_f\left[\ln\left(\frac{Bi_f}{Bi_f}\right)+\frac{1}{Bi_R}\right]} \tag{16}$$

One can determine the critical value of $\Theta_{hr}$ by differentiating Equation (16) with respect to $Bi_f$, as follows:

$$\frac{\partial \Theta_{hr}}{\partial Bi_f} = 0 \tag{17}$$

From Equation (17), the critical value for $Bi_f$ is given by the following equation:

$$Bi_{fC} = Bi_R \exp\left[\frac{1}{Bi_R} - 1\right] \tag{18}$$

Substituting this value into Equation (16) gives the critical value for $\Theta_{hr}$, as below:

$$\Theta_{hrC} = \frac{1}{Bi_{fC}} \tag{19}$$

These critical values are listed in Table I for several different dimensionless nozzle radii. The values in this table were confirmed by numerical calculations using Equation (12).

TABLE I

| $Bi_R$ | $Bi_{fC}$ | $\Theta_{hrC}$ | max $Bi_{fC}$ | $\Theta_{hrC}$ |
|---|---|---|---|---|
| 0.50 | [1.36] | [0.736] | 0.50 | 1.000 |
| 0.75 | [1.05] | [0.955] | 0.75 | 1.000 |
| 1.00 | 1.00 | 1.000 | | |
| 2.0 | 1.21 | 0.824 | | |
| 3.0 | 1.54 | 0.649 | | |
| 4.0 | 1.89 | 0.529 | | |

For those nozzle radii which are less than 1.0, the computed values for the critical flow radius $Bi_{fC}$ exceed the nozzle radius; that is, the critical flow radius lies outside the nozzle radius, and is therefore imaginary. These values are contained in brackets in the above table. The maximum value for the critical flow radius is that of the nozzle radius, and thus the critical value for $\Theta_{hr}$ is 1.000.

Figure 6:
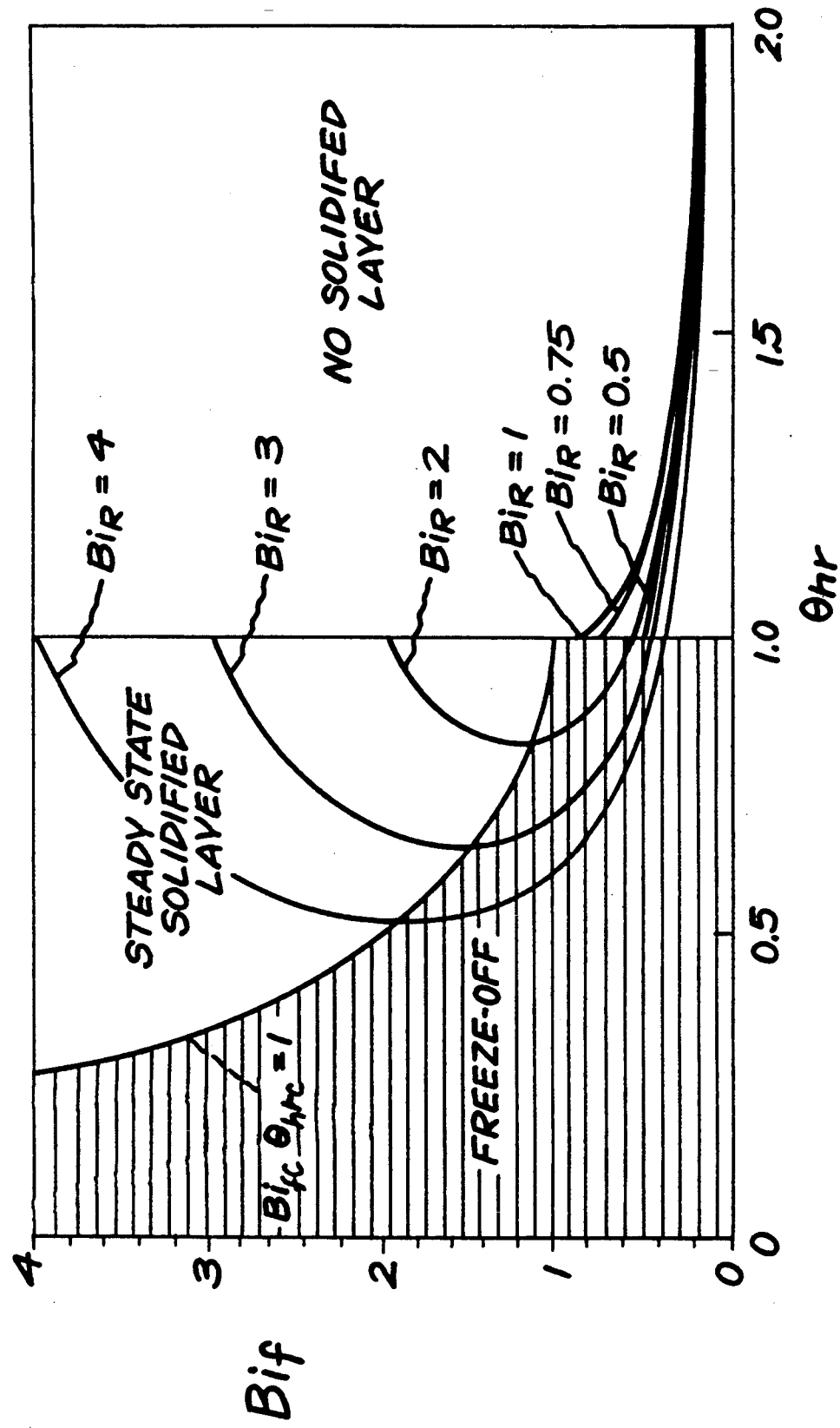
FIG. 6 is a graphical representation of the generation of a process window according to the method of the present invention, wherein various values of the parameter $Bi_R$ are shown on a plot of a parameter $Bi_f$ against the combined superheat and heat transfer ratio parameter $\Theta_{hr}$.

FIG. 6 shows the solution for Equation (16) for several different dimensionless nozzle radii ($Bi_R = 0.5$, 0.75, 1.0, 2.0, 3.0, and 4.0). The leftmost point in each curve specifies the critical value for $\Theta_{hr}$. If the value of the parameter $\Theta_{hr}$ for some given nozzle radius and processing conditions is less than the critical value, then the point lies to the left of the plotted curve, and freeze-off of the nozzle will occur (whereby Equation 15 evaluates to be less than zero). If the value for $\Theta_{hr}$ for some nozzle radius and processing conditions lies between $\Theta_{hrC}$ and 1, then a stable layer will form. If the value for $\Theta_{hr}$ is greater than or equal to 1 for some nozzle radius and processing conditions, then no layer at all will form, as this condition satisfies the re-melting criterion discussed with respect to Equation (15). The three regions are delineated in FIG. 6. From FIG. 6, it can also be observed that the processing conditions should be chosen such that the point will lie inside the steady-state region, in order to form a stable solidified layer.

From Table I, one can further understand the results presented in FIG. 3. For $Bi_R=2.0$, the critical value for $\Theta_{hr}$ from Equations (18) and (19) is 0.824. Therefore, the curve produced for $\Theta_{hr}=0.85$ (FIG. 4b) does indicate, a steady-state solution, as this value exceeds $\Theta_{hrC}$, whereas that for $\Theta_{hr}=0.75$ cannot form a steady-state solution and will freeze off with time. However, as discussed earlier in the specification, the real solution for the formation of a solidified layer inside a nozzle whose dimensionless radius is 2.0 will deviate somewhat from this solution.

There are two special cases concerning Equation (15) which deserve further attention, one in which there is no initial solidified layer and another in which an initial pre-packed layer of some finite thickness exists. Each of these cases will be considered, with an emphasis on the strategy by which a steady-state solidified layer can be achieved and maintained.

In the case where there is no initial solidified layer inside the nozzle, the initial radius of the flow region $Bi_{fI}$ is equal to the nozzle radius $Bi_R$. The remelting-/solidifying criteria given by Equation (15) can be reduced to the following form when $Bi_{fI}=Bi_R$:

$$Bi_R(\Theta_{hr} - 1) = 0 \rightarrow \text{steady-state} \quad (20)$$
$$> 0 \rightarrow \text{no solidified layer}$$
$$< 0 \rightarrow \text{solidifying}$$

When Equation (20) evaluates to be greater than zero (that is, $\Theta_{hr}>1$), no solidified layer forms. When this equation evaluates to be less than zero ($\Theta_{hr}<1$), the solidifying condition is met. If $\Theta_{hr}$ is less than the critical value, then the nozzle will freeze Off.

Therefore, a steady-state solution without freezeoff can only be achieved if the following criterion is met:

$$\Theta_{hrC} \leq \Theta_{hr} < 1 \quad (21)$$

For those cases in which the nozzle radius $Bi_R$ is greater than 1.0, a steady state solidified layer can be formed, if the value of $\Theta_{hr}$ for the processing conditions falls within the range specified by Equation (21).

For those cases in which the nozzle radius $Bi_R$ is less than or equal to 1.0, a steady state solidified layer cannot be formed, because the critical value for $\Theta_{hr}$ is always equal to 1.0, as seen in Table I. There is no value, which the process parameter $\Theta_{hr}$ can take, which falls between 1.0 and 1.0, as specified by Equation (21). If the processing conditions result in a value for $\Theta_{hr}$ which is less than 1.0, the nozzle will freeze off, and if the process value is greater than or equal to 1.0, then no solidification will occur.

In what may be considered the converse situation of that described above, an initial pre-packed solidified layer of some finite thickness exists, such that the initial radius of the flow region $Bi_{fI}$ is less than the nozzle radius $Bi_R$. An initial solidified layer is needed in practice so that the liquid melt does not react with the nozzle material. This initial pre-packed solidified layer will melt, increase in thickness, or remain at its starting value, depending on the initial processing conditions. The initial flow radius of the nozzle will have a corresponding $\Theta_{hrI}$ associated with it, as Computed by Equation (16).

Figure 7:
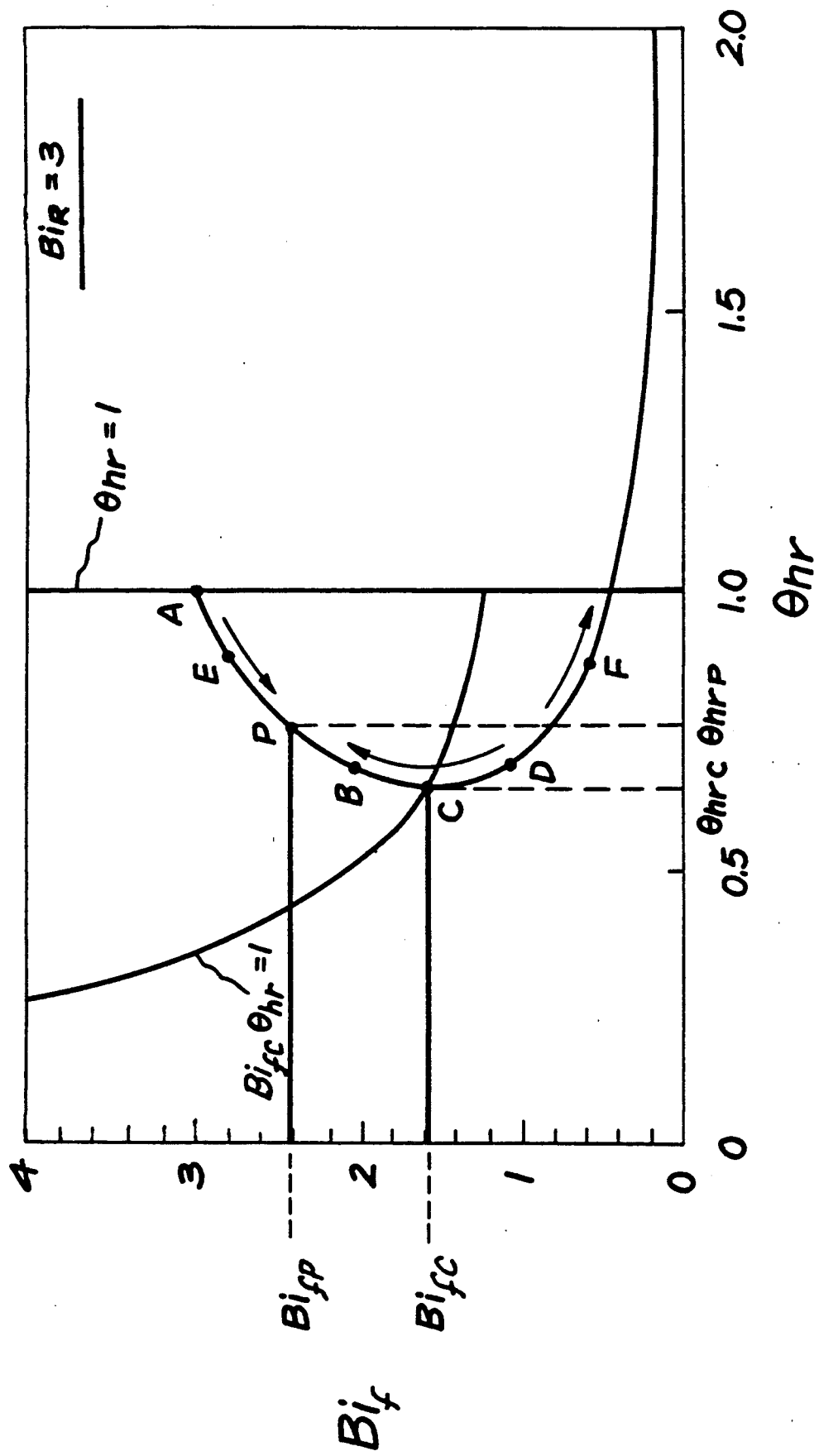
FIG. 7 is a graph of $Bi_f$ plotted against $\Theta_{hr}$ wherein the reaction of the process from various selected points on the graph are displayed.

Reference will now be made to FIG. 7 to illustrate the formation of a solidified layer starting with an initial pre-packed layer, for the specific case in which the dimensionless nozzle radius is equal to 3.0. Point C in this figure defines the critical flow radius and the critical value for $\Theta_{hr}$, which is $\Theta_{hrC}$. A particular process, which is based on the design parameters selected, will have process values of $Bi_f$ and $\Theta_{hr}$ associated with it, as defined by point P in FIG. 7. The process parameters are advantageously chosen such that this point lies within the steady state region of the curve.

The first case to be mentioned is that in which the initial flow radius is equal to the nozzle radius, which is point A in FIG. 7. This is precisely the situation discussed previously in which no initial pre-packed layer exists, and the criteria discussed with respect to that situation will apply here as well.

If the initial value for the flow radius is equal to the process value, then the situation is illustrated by point P in FIG. 7. In this case, the layer neither solidifies nor re-melts, but stays at its current thickness, because this is already the steady-state value.

The next case to be considered is that in which the initial value for $\Theta_{hrI}$, as computed by Equation (16), is less than the process value of $\Theta_{hr}$. This case is defined by points B and D in FIG. 7, and is represented by the following equation:

$$\Theta_{hrC} \leq \Theta_{hrI} \leq \Theta_{hrP} \leq 1 \quad (22)$$

Since the process value for $\Theta_{hr}$ should lie somewhere in the steady-state region of FIG. 6, it should always be greater than the critical value. According to Equation (15) the remelting criterion is met for this case, since substitution in Equation (15) results in a value which is greater than zero. The layer will decrease in thickness until the flow radius has increased to the process value, $Bi_{fP}$, which becomes the steady-state value.

If the initial value for $\Theta_{hrI}$, as computed by Equation (16), is greater than the process value of $\Theta_{hr}$, then the case is represented by the following equation;

$$\Theta_{hrC} \leq \Theta_{hrP} \leq \Theta_{hrI} \leq 1 \quad (23)$$

According to Equation (15), the solidifying criterion is met for this situation. If the initial flow radius $Bi_{fI}$ is greater than the process flow radius, that is, the initial solidified layer is "thin", then the layer will continue to solidify until the steady state condition defined by the process parameters is met. This case is defined by point E in FIG. 7. If, on the other hand, the initial value for the flow radius is less than the process value (that is, the initial layer is "thick"), the solidification will never pass the steady state and therefore will continue until the nozzle freezes off. This situation is defined by point F in FIG. 7. In practice, only a thin pre-packed layer, as shown by point E, is needed for achieving a stable solidified layer.

Thus, a process window for maintaining a stable skull may be obtained in the above manner by deriving the equation, representative of the solidification layer in a cylinder or nozzle, using the aforementioned dimensionless parameters, and subsequently selecting the defining critical values for the parameter(s), as $\Theta_{hr}$ given in the previous example, between which the continuous skull nozzle process will be able to maintain a stable skull configuration. For a specific material being processed, actual values for these parameters, based on the material properties and process conditions, may be obtained, and it will thus be possible to control the process to maintain the conditions required to keep the process operating within the process window.

A processing map or window is thus generated to illustrate the relationships among the physical parameters. This is done by plotting the criteria developed, as explained in detail above, for the formation of a stable solidified layer.

Referring back to FIG. 3, a process window Z which defines the domain in which one can obtain a steady-state solidified layer is illustrated. If the combined superheat and heat transfer ratio processing parameter $\Theta_{hr}$ is greater than or equal to one, for any value of $Bi_R$, then no solidified layer is formed. The molten material will react immediately with the nozzle or crucible material, causing possible contamination. On the other hand, if this parameter is less than the critical value, $\Theta_{hrC}$, then the nozzle will freeze off with time. The time required for this freeze-off can be estimated from transient calculations. If $\Theta_{hr}$ falls between one and the critical value, then a steady-state solidified layer can be formed.

As shown in FIG. 3, there is a lower limit on the dimensionless nozzle radius $Bi_R$ which determines the actual nozzle size. If this dimensionless radius is less than or equal to 1, then no steady-state solidified layer can be formed for any set of processing conditions.

The first step in implementing the use of a stable solidified layer inside a nozzle for clean melt production is to locate or estimate the thermal properties of the particular melt of interest, namely, the density, specific heat, thermal conductivity, latent heat, viscosity, and phase transition temperature.

Inner and outer heat transfer coefficients for the process must also be calculated using the equations which follow. The inner heat transfer coefficient h2 is that at the interface between the flowing molten metal and the solidified layer, as illustrated in FIG. 2. The value of this coefficient can be calculated as follows:

$$h_2 = \frac{Nuk}{D} \tag{24}$$

where D is the diameter of the nozzle and Nu is the Nusselt number for the molten metal, which can be approximated as follows:

$$Nu = 4.82 + 0.0185(RePr)^{0.827} \tag{25}$$

in which Re and Pr are defined as follows:

$$Re = \frac{\rho VD}{\mu}, Pr = \frac{\mu C_p}{k} \tag{26, 27}$$

where V is the melt velocity.

For a thin stable solidified layer, the radius of the flow region will not differ significantly from the nozzle radius, and the value for h2 will not be altered. Although prior studies have recognized that there may be some local variations in the surface structure of a solidified layer such as that inside the nozzle, it is believed to be sufficient for the present invention to consider an average effect in the layer build-up and ignore the effects of local variations.

The outer heat transfer coefficient h1 is the overall coefficient at the interface between the solidified layer and the nozzle wall, including the effect of the cooling channels inside the nozzle wall. The value of this coefficient is calculated in the following manner:

$$h_1 = \frac{1}{\frac{1}{h_o} + \frac{1}{kS}} \tag{28}$$

where $h_o$ is the heat transfer coefficient of the coolant and S is the shape factor, which depends on the depth of the cooling channels from the nozzle surface as well as the distance between parallel channels. The dimensionless superheat temperature may also be calculated, using the coolant temperature inside the channels as the ambient temperature $T_a$.

All of the necessary parameters are now available to compute the transient solution for the thickness of the solidified layer, as given in Equation (12). The processing conditions can be adjusted until a stable layer can be formed, using the criteria developed in the present invention and described earlier in the specification and process windows or maps Z such as that shown in FIG. 3.

Referring back to FIG. 1, a preferred method of controlling the process of the present invention to maintain a stable skull nozzle configuration employs a control strategy involving the monitoring and adjusting of a pressure differential between the gas pressure inside crucible 12 and the pressure outside the crucible at melt discharge region. It has been determined in accordance with the present invention that a minor pressure difference, on the order of a few pounds per square inch (psi), between the inside and outside gas pressure may be effectively used to control the molten metal flow rate, which in turn affects the heat transfer rate, the skull thickness and the melt stream diameter. More specifically, once a process window has been defined for a particular material being processed in a continuous skull nozzle process, the processing conditions or parameters may be selected such that then controlling the gas pressure inside the crucible and/or outside the crucible to achieve a gas pressure differential on the order of a few psi will result in the process being operated within the defined process window. Preferably, the processing conditions established will permit the gas pressure differential to be controlled such that the gas pressure $P_i$ inside the crucible 12 is up to a few, e.g. 1-5, psi lower than the pressure $P_o$ of the ambient or controlled environment outside the crucible.

The required pressure differential determined by balancing the head (or depth), H, of the molten metal inside the crucible 12 and the pressure loss in the nozzle region can be achieved by either creating a partial vacuum inside the crucible 12, or creating a positive ambient pressure at the melt stream free surface, or by employing a combination of these two conditions. Equipment for achieving these methods of control is more or less conventional, and one of ordinary skill in the art will recognize that the crucible may be set up in various ways to permit the controlling of the gas pressure differential.

The use of a controlled pressure differential has a similar effect to the previously proposed use of magnetic levitation to generate pressure force on the melt stream free surface by an induction coil, of which the technique was discussed earlier in the "Background of the Invention" section of the present specification. The differential pressure direct control approach of the present invention, however, provides several advantages over the levitation approach.

In addition, the magnetic levitation technique has been propounded as a means for eliminating the use of a skull or eliminating the problems associated with attempting to maintain a stable skull geometry inside a crucible and nozzle, by providing a means for confining the melt stream which does not rely on physical contact of the molten metal with a containment vessel to control the molten metal flow rate. These previous efforts have failed to recognize that a process window could be developed to identify the process operating conditions at which a skull nozzle will be able to maintain a stable geometry, and that the melt stream flow rate could be controlled for the purpose of bringing the process operating conditions within the process window developed.

The viscosities of molten titanium/titanium alloys are generally very low, and any minor disturbances or asymmetry conditions in the melt stream environment will induce instability creating problematic operating conditions, for example, splash or formation of satellite droplets. The pressure differential control naturally provides a symmetric force along the melt stream free surface, which is very difficult to achieve in the levitation approach due to the many geometric factors involved in the coil design. Further, the levitation approach would require a substantial concept validation process involving geometric factors such as location, shape and diameter of the induction coil and the cooling channel, and the asymmetry connection of the power input would have to be carefully analyzed and designed before even a prototype would be constructed.

The pressure differential control method of the present invention imposes no additional power input requirements and associated current and voltage controls for maintaining stability in the melt stream. Finally, the strong electromagnetic field required for the levitation approach may generate unnecessary induction heating on the crucible, the nozzle, and any skull surface which might be employed, and may cause interference with other local electric functions, such as the plasma arc melting employed to melt the titanium/titanium alloy in the crucible.

A further important feature of using the method of pressure differential control is that, because the pressure differential can effectively and accurately control the molten metal flow rate, there will be much less of a restriction on the nozzle size which may be employed in a particular continuous skull nozzle process. The method of pressure differential control may also be employed to control process start-up conditions wherein the molten metal flow rate is to be gradually increased before reaching a steady state. Changes in superheat temperature and in the cooling rate may be considered as secondary control parameters to complement the primary pressure differential control parameter in the method of the present invention.

The foregoing description includes various details and particular features according to a preferred embodiment of the present invention, however, it is to be understood that this is for illustrative purposes only. Various modifications and adaptations may become apparent to those of ordinary skill in the art without departing from the spirit and scope of the present invention. Accordingly, the scope of the present invention is to be determined by reference to the appended claims.

What is claimed is:

1. A method for a continuous skull nozzle process for melting and discharging liquid metals or metal alloys having a container with an inside, a steady-state skull substantially located on the inside of said container and an amount of liquid metal or alloy retained in said container comprising the steps of:
   forming a skull;
   determining a desired discharge range;
   creating a pressure differential between the inside of said container and an area exterior of said container; and
   controlling said pressure differential so as to maintain a discharge flow rate of said melt of said metal or alloy within said predetermined discharge range.

2. A method as defined in claim 1 wherein said predetermined desired range of said discharge flow rate of said metal or alloy is determined after the further step of defining a process window indicative of a range of processing conditions within which said steady state solidified layer will be maintained and outside of which a steady state solidified layer cannot be maintained.

3. A method as defined in claim 2 wherein said process window is defined in terms of two or more dimensionless parameters which are based on dependent and independent materials and process variables.

4. A method as defined in claim 3 wherein said pressure differential is controlled such that said pressure inside said crucible is on the order of a few pounds per square inch less than said pressure at a discharge outlet outside of said crucible.

5. A method as defined in claim 4 wherein a dimensionless nozzle radius comprises one of said dimensionless parameters defining said process window.

6. A method as defined in claim 5 wherein a dimensionless combined parameter taking into account the superheat of the melt and the heat transfer ratio at an outer and inner surface of said solidified layer comprises one of said dimensionless parameters defining said process window, and wherein said process window may be graphically represented by plotting a range of dimensionless nozzle sizes against a range of values of said combined superheat and heat transfer ratio parameter.

7. A method for controlling a continuous skull nozzle process used in producing metals or alloys from a melt comprising:
   defining a process window indicative of a range of processing conditions within which a steady-state solidified layer of said metal or alloy is maintained at a desired thickness inside a discharge nozzle, and outside of which a steady-state solidified layer of said metal or alloy cannot be maintained, said process window being defined in terms of two or more dimensionless parameters based on dependent an independent materials and process variables; and
   controlling at least one process variable as necessary to maintain a processing condition of said continuous skull nozzle process within said process window, wherein said process variable control step comprises controlling at least a pressure differential between the inside of a crucible containing a molten metal or alloy and the outside of said crucible to control a molten metal flow rate through a discharge nozzle in said crucible.

8. A method as defined in claim 7, wherein said pressure differential is controlled such that said pressure inside said crucible is on the order of a few pounds per square inch less than said pressure at the outside of said discharge nozzle.

9. A method as defined in claim 8 wherein said pressure inside said crucible is controlled to be of about 1–5 pounds per square inch less than said pressure at said outside of said crucible.

10. A method as defined in claim 7 wherein a dimensionless nozzle radius comprises one of said dimensionless parameters defining said process window.

11. A method as defined in claim 10 wherein a dimensionless combined parameter taking into account the superheat of the melt and the ratio of heat transfer coefficients at the inner and outer surfaces of said solidified layer comprises one of aid dimensionless parameters defining said process window, and wherein said process window may be graphically represented by plotting a range of dimensionless nozzle sizes against a range of values of said combined superheat and heat transfer ratio parameter.

12. A method for controlling a continuous skull nozzle process used in producing metal or alloys from a melt of said metal or alloy comprising the steps of:
defining a process window indicative of the formation of a steady stat solidified layer of said metal or alloy inside a nozzle in a continuous skull nozzle process, said process window being defined in the steps of:
grouping a set of dependent and independent material and process variables into dimensionless parameters; deriving a solution by an integral approach to an equation representing a moving solidification layer within a cylindrical nozzle using a logarithmic approximation for a temperature profile across the layer said solution being derived and expressed in terms of more than one of said dimensionless parameters;
determining from said solution a range of values for one or more of said dimensionless parameters identifying conditions in which said steady state solidified layer will be maintained in said nozzle; and
selecting and controlling at least one process operating parameter such that said dimensionless parameters associated with said process will fall within said range of values of said dimensionless parameters, thereby maintaining said steady state solidified layer, and wherein said at least one process operating parameter is a pressure differential between the interior of a crucible employed in said continuous skull nozzle process and the exterior of said crucible.

13. A method as defined in claim 12 wherein said pressure differential is selected to be on the order of a few pounds per square inch.

14. A method as defined in claim 13 wherein said pressure differential is selected such that said pressure inside said crucible is lower than said pressure outside said crucible.

15. A method as defined in claim 14 wherein said pressure differential is selected to be on the order of 1–5 pounds per square inch.

16. A method as defined in claim 12 wherein said process window is defined by mapping a range of values of a dimensionless nozzle radius against a combined superheat and heat transfer ratio parameter in which a steady state solidified layer of said metal will be maintained.

17. A method as defined in claim 12 wherein a dimensionless combined parameter taking into account the superheat of the melt and the ratio of heat transfer coefficients at the inner and outer surfaces of said solidified layer comprises one of said dimensionless parameters defining said process window, and wherein said process window may be graphically represented by plotting a range of dimensionless nozzle sizes against a range of values of said combined superheat and heat transfer ratio parameter.

18. A method as defined in claim 4 wherein said pressure differential is further comprised of the steps of:
creating a partial vacuum inside said container or
creating a positive ambient pressure near said discharge outlet.

19. A method as defined in claim 7 wherein said pressure differential is further comprised of the steps of:
creating a partial vacuum inside said container or
creating a positive ambient pressure near said discharge outlet.

20. A method as defined in claim 14, wherein said pressure differential is further comprised of the steps of:
creating a partial vacuum inside said container or
creating a positive ambient pressure around said outside of said container.

* * * * *